US00RE44174E

(19) United States
(12) Reissued Patent
Aarras

(10) Patent Number: US RE44,174 E
(45) Date of Reissued Patent: Apr. 23, 2013

(54) DISPLAY CHANGING IN A PORTABLE ELECTRONIC DEVICE

(75) Inventor: Mikko Aarras, Helsinki (FI)

(73) Assignee: Nokia Corporation, Espoo (FI)

(21) Appl. No.: 13/435,523

(22) Filed: Mar. 30, 2012

Related U.S. Patent Documents

Reissue of:
(64) Patent No.: 7,460,893
Issued: Dec. 2, 2008
Appl. No.: 11/131,876
Filed: May 17, 2005

(51) Int. Cl.
*H04M 1/00* (2006.01)

(52) U.S. Cl.
USPC ..... 455/575.3; 455/550.1; 455/566; 345/169; 361/730; 348/333.06

(58) Field of Classification Search ..... 455/550.1, 455/566, 575.1–575.3; 345/2.3, 169, 905; 361/680, 730; 348/333.01, 333.06
See application file for complete search history.

(56) References Cited

U.S. PATENT DOCUMENTS

| | | | | |
|---|---|---|---|---|
| 5,761,485 | A | 6/1998 | Munyan | 395/500 |
| 6,434,370 | B1 | 8/2002 | Kodera et al. | 455/90 |
| 6,466,202 | B1 | 10/2002 | Suso et al. | 345/169 |
| 7,187,957 | B2 | 3/2007 | Kato | 455/575.3 |
| 7,301,555 | B2 * | 11/2007 | Navntoft | 348/14.02 |
| 7,315,291 | B2 | 1/2008 | Yoshihara et al. | 345/1.1 |
| 7,359,003 | B1 * | 4/2008 | Knighton et al. | 348/376 |
| 7,440,784 | B2 * | 10/2008 | Chung et al. | 455/575.3 |
| 2002/0015035 | A1 * | 2/2002 | Inaba et al. | 345/204 |
| 2002/0180767 | A1 | 12/2002 | Northway et al. | 345/698 |
| 2003/0076277 | A1 | 4/2003 | Muramatsu et al. | 345/1.1 |
| 2003/0222846 | A1 | 12/2003 | Nguyen | 345/156 |
| 2003/0224832 | A1 | 12/2003 | King et al. | 455/566 |
| 2004/0014485 | A1 | 1/2004 | Sugauchi et al. | 455/550.1 |
| 2004/0061662 | A1 | 4/2004 | Yoshihara et al. | 345/1.1 |
| 2004/0072589 | A1 | 4/2004 | Hamamura et al. | 455/550.1 |
| 2004/0212602 | A1 | 10/2004 | Nako et al. | 345/173 |
| 2004/0212956 | A1 | 10/2004 | Kuivas et al. | 361/683 |
| 2004/0229664 | A1 | 11/2004 | Chadha | 455/575.1 |
| 2005/0083642 | A1 | 4/2005 | Senpuku et al. | 361/681 |
| 2005/0101358 | A1 | 5/2005 | Carpenter | 455/575.1 |
| 2005/0282596 | A1 | 12/2005 | Park et al. | 455/575.3 |
| 2007/0164923 | A1 | 7/2007 | Kanai et al. | 345/1.1 |

FOREIGN PATENT DOCUMENTS

| | | | |
|---|---|---|---|
| CN | 1292112 | A | 4/2001 |
| EP | 1 035-710 | A1 | 9/2000 |
| EP | 1 058 181 | A1 | 12/2000 |
| EP | 1 335 567 | A1 | 8/2003 |
| JP | 2000-039856 | | 2/2000 |
| JP | 2000-253113 | A | 9/2000 |
| JP | 2000-295326 | A | 10/2000 |
| JP | 2003-131612 | A | 5/2003 |
| JP | 2005-115536 | A | 4/2005 |

* cited by examiner

*Primary Examiner* — Nhan Le
(74) *Attorney, Agent, or Firm* — Harrington & Smith

(57) ABSTRACT

A portable electronic device including a first section having a first display on a first side of the first section; and a second section pivotably connected to the first section. The second section includes a second display on a first side of the second section. The second section comprises a second side opposite the first side of the second section. When the first and second sections are in a first folded configuration relative to each other the first side of the first section is located opposite the second side of the second section.

22 Claims, 10 Drawing Sheets

DISPLAY CHANGING IN A PORTABLE ELECTRONIC DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to a portable electronic device and, more particularly, to selection of images to be displayed with a portable electronic device.

2. Brief Description of Prior Developments

U.S. Patent Application Publication No. 2003/0224832 A1 discloses a foldable cellular telephone having an upper portion and a lower portion connected by a hinge, and two displays; one display located on each of the upper and lower portions. The two displays face each other in a folded configuration. A lens positionable over one of the displays is also disclosed. This publication illustrates a basic idea that making some selection on a first display changes what is shown on a second display on a general level. U.S. Patent Application Publication No. 2004/0212602 discloses a display device with two displays which face each other in a folded configuration. This publication illustrates that the user can turn a page by an open/close operation of a device with two displays and a hinge.

U.S. patent application Ser. No. 10/877,525 filed Jun. 25, 2004, which is hereby incorporated by reference in its entirety, discloses a mobile communications device with rotating displays and cameras. U.S. patent application Ser. No. 10/421,278 filed Apr. 23, 2003, which is hereby incorporated by reference in its entirety, discloses a hinge for use in a portable electronic device.

Normal fold type phones are basically opening monoblocks, where the mechanical movement does not really have an effect on the phone behavior. Opening the phone only reveals the phone and its functionalities and controls. There have been ideas around 360 degree movement hinges, and attempts to apply that technology to similar to existing folds, but without real benefits to usability.

SUMMARY OF THE INVENTION

In accordance with one aspect of the invention, a portable electronic device is provided including a first section having a first display on a first side of the first section; and a second section pivotably connected to the first section. The second section includes a second display on a first side of the second section. The second section comprises a second side opposite the first side of the second section. When the first and second sections are in a first folded configuration relative to each other the first side of the first section is located opposite the second side of the second section.

In accordance with another aspect of the invention, a portable electronic device is provided comprising a first section comprising a first display; a second section pivotably movable relative to the first section; a sensor for sensing movement of the first and second sections relative to each other; and a system connected to the sensor for changing an image displayed on the first display based upon movement of the first and second sections relative to each other.

In accordance with another aspect of the invention a method of displaying images on displays of a portable electronic device is provided comprising providing the portable electronic device with a first section having a first display and a second section having a second display, wherein the first section is pivotable relative to the second section; and selecting an image to be displayed on the first display based, at least partially, upon movement of the second section relative to the first section and an application selected or running on the second display.

In accordance with another aspect of the invention, a method of changing display of images in a portable electronic device is provided comprising providing the portable electronic device with a cover section pivotably movable relative to a base section, wherein at least one of the cover section and base section comprise a display; displaying a first one of the images on the display; and moving the cover and base sections relative to each other. A second different one of the images is automatically displayed on the first display or a second display based upon the movement of the cover and base sections relative to each other.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
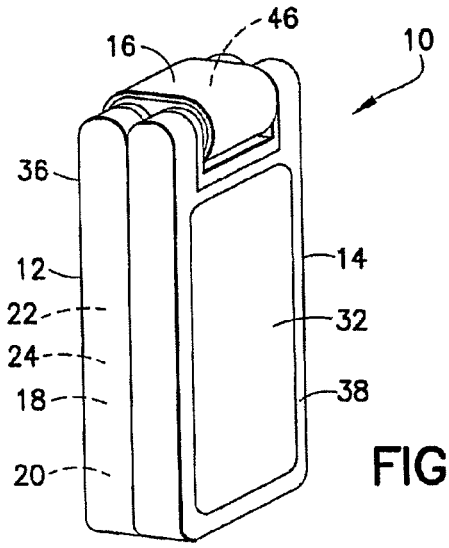
FIG. 1 is a perspective view of a portable electronic device incorporating features of the invention shown in a first folded configuration.

Referring to FIG. 1, there is shown a perspective view of a portable electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
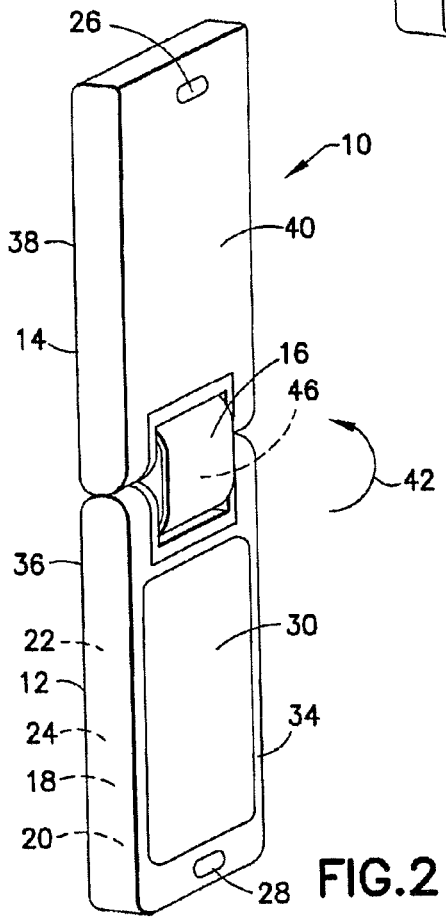
FIG. 2 is a perspective view of the device shown in FIG. 1 in an open, unfolded configuration.

The device 10, in the embodiment shown, is a mobile communications device. In particular, the device 10 is a mobile telephone. However, features of the invention could be used in any suitable type of portable electronics device such as, for example, a portable gaming device, a PDA, or a laptop/notebook computer. The telephone 10 generally comprises a first section 12, a second section 14, and a connection section 16. In this embodiment the first section 12 forms a base for the telephone and the second section forms a cover. Referring also to FIG. 2, the telephone comprises electronic circuitry including a transceiver 18, an antenna 20, a memory 22, a controller 24 such as a microprocessor, a speaker or sound transducer 26 and a microphone 28. The telephone 10 can comprise other telephone or mobile communicator elements as known in the art.

Figure 3:
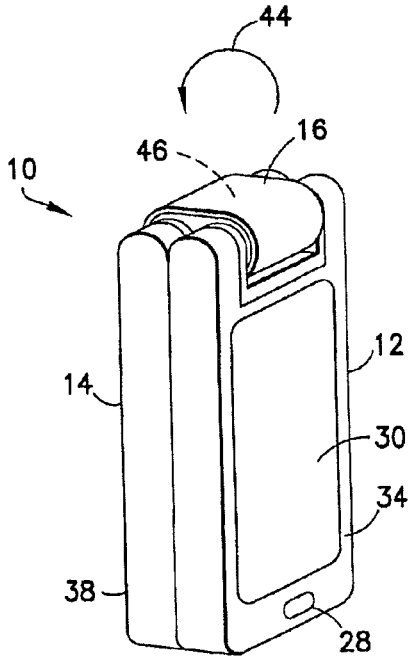
FIG. 3 is a perspective view of the device shown in FIG. 1 in a second folded configuration.

In this embodiment most of the electronics are located in the first section 12. However, the electronics could also be located in the second section 14 and connection section 16. Referring to FIGS. 1-3, the first section 12 comprises a first side 34 and a second side 36. A first display 30 is located on the first side 34. The first display 30 can function as part of the user interface (UI), such as a touch screen. However, the UI on the first section could comprise buttons, keys, a trackball and/or any other suitable type of user interface system. Thus, the first display does not need to be a touch screen. It could merely be a display screen.

The second section 14 comprises a first side 38 and a second side 40. In this embodiment, the first side 38 of the second section 14 comprises a second display 32 which can function as part of the user interface (UI), such as a touch screen. However, the UI on the second section could comprise buttons, keys, a trackball and/or any other suitable type of user interface system. Thus, the second display does not need to be a touch screen. It could merely be a display screen. In addition, more or less than two displays could be provided.

FIG. 1 shows the telephone 10 is a first folded configuration. FIG. 3 shows the telephone 10 is a second folded configuration. FIG, 2 shows the telephone 10 in an intermediate position or open position between the first and second folded positions. The connection section 16 allows the first and second sections 12, 14 to be pivotably moved relative to each other as indicated by the arrows 42, 44. In addition, the first and second sections 12, 14 can be pivotably moved relative to each other reverse to the directions indicated by the arrows 42, 44. Thus, the first and second sections 12, 14 can be moved relative to each other between the first and second folded configurations. Although the invention is shown in the embodiment of FIGS. 1-3 as having the connection section 16 at top sides of the first and second sections, the connection section could be provided at left or right sides, or any other suitable movable connection between folded or partially folded configurations could be provides. In addition, if the device comprises more than two sections, such as three sections for example, features of the invention could be used without completely folding all the sections into a front-to-back stacked configuration as shown in FIGS. 1 and 3.

Figure 4:
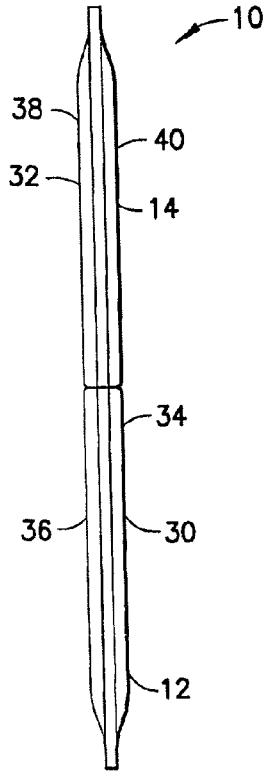
FIG. 4 is a side view of the device shown in FIG. 2.
Figure 5:
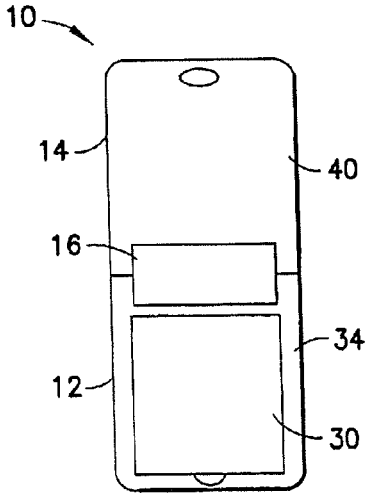
FIG. 5 is a front view of the device shown in FIG. 2.
Figure 6:
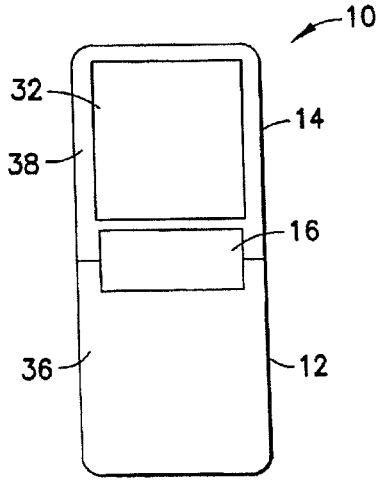
FIG. 6 is a rear view of the device shown in FIG. 2.

Referring also to FIGS. 4-6 which show the telephone 10 in the open position shown in FIG. 2, in the open position the two displays 30, 32 are located facing opposite directions. However, in the folded configurations shown in FIGS. 1 and 3, the displays 30, 32 face the same direction. In the first folded configuration shown in FIG. 1 the first side 34 of the first section 12 with the first display 30 is located opposite the second side 40 of the second section 14. Thus, the second section 14 substantially covers the first display 30. In the second folded configuration shown in FIG. 3, the first side 38 of the second section 14 with the second display 32 is located opposite the second side 36 of the first section 12. Thus, the first section 12 substantially covers the second display 32. The first and second sections are able to be repeatedly flipped forwards or backwards relative to each other similar to a top wirebound steno book or memo book.

The connection section 16 preferably comprises a sensor 46 to sense when the first and second sections are moved relative to each other. Alternatively, or additionally, the first and/or second sections could comprise the sensor(s). The sensor 46 is coupled to the controller 24. The controller 24 is adapted to change an image displayed on at least one of the displays 30, 32 based, at least partially, upon a signal from the sensor 46 that the first and second sections 12, 14 have been moved relative to each other, such as moved from the first folded configuration to the second folded configuration, and visa versa. In a preferred embodiment, the sensor 46 can also signal if that movement is a forward flipping movement (arrows 42, 44) or a reverse flipping movement (reverse to arrows 42,44).

The connection section 16 in this embodiment is merely shown as a hinge type of connection. However, in an alternate embodiment, the connection section could comprise a rotatable section to allow the two sections 12, 14 to be rotated 180° relative to each other orthogonal to the path of rotation illustrated in FIGS. 1-3. Thus, the first sides 34, 38 could face each other, such as for storage or transport in a pocket, purse or business case.

Figure 7:
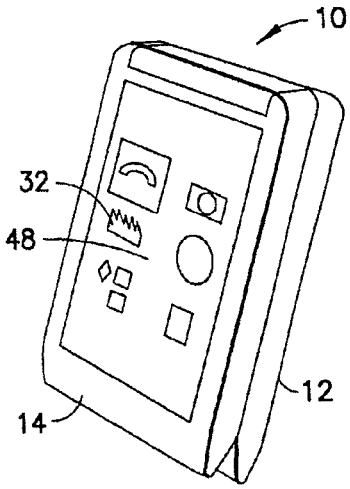
FIG. 7 is a perspective view of the device shown in FIG. 1 with a first image on the display.
Figure 8:
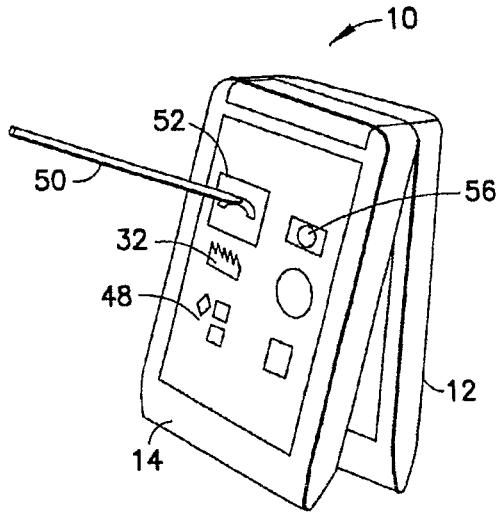
FIG. 8 is a perspective view as in FIG. 7 showing selection of an application/mode icon by a user.
Figure 9:
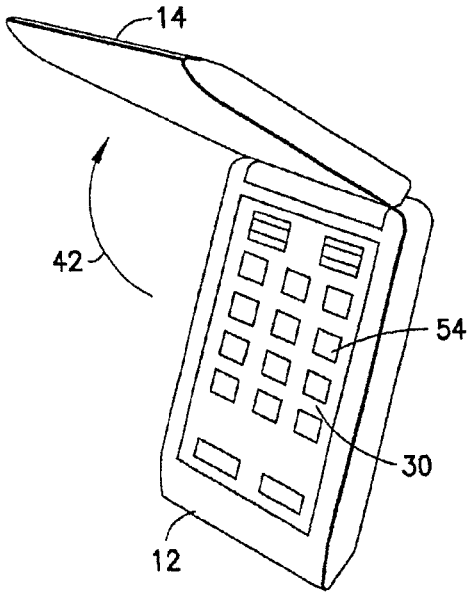
FIG. 9 is a perspective view of the device shown in FIG. 8 with the two sections in the process of being moved relative to each other.
Figure 10:
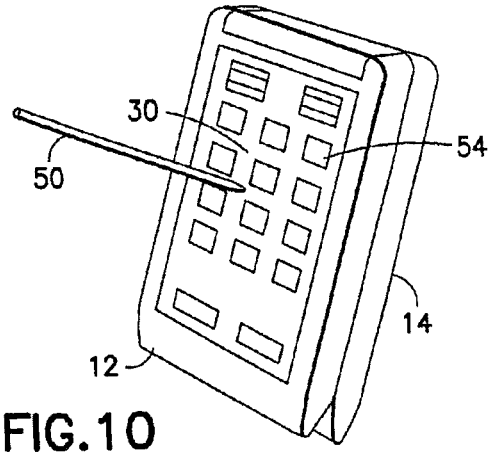
FIG. 10 is a perspective view of the device shown in FIG. 9 after being moved to the second folded configuration shown in FIG. 3.
Figure 11:
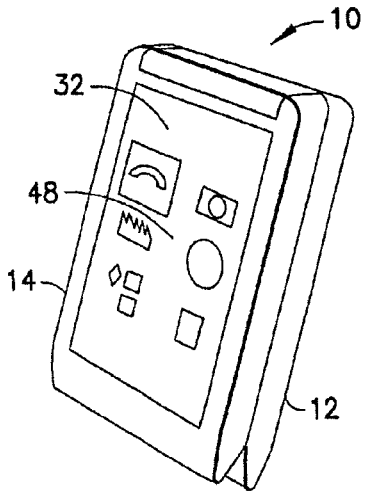
FIGS. 11-16 are perspective views of the device shown in FIG. 7 being used and configured to implement a second type of method of using the invention.

Referring now also to FIGS. 7-10, one method of using the invention will be described. FIG. 7 shows the telephone 10 in the first folded configuration similar to FIG. 1, but with a first image 48 shown on the second display 32. The first image 48 in this embodiment comprises icons for selecting or launching various applications or programs. FIG. 8 shows use of a pen or stylus 50 to select one of the icons 52 by a user. In an alternate embodiment, a pen or stylus might not be used, such as when the user uses his or her finger to select the icon. The selected icon 52 in this example is the telephone icon for making a telephone call. However, any suitable icon could be selected, such as a photo album icon, a game folder icon, or a music file album icon or video file album icon for example. After selecting the application/program/file as shown in FIG. 8, the user can flip the second section 14 as shown in FIGS. 9 and 10 into the second folded configuration with the first display 30 now being located at the front of the device.

A second image 54 is displayed on the first display 30. The controller 24 determines what image to display as the second image. In particular, the controller 24 uses the input from the sensor 46 and the user's selection from the section display 32, before flipping occurs, to determine what image should be displayed on the first display 30. In this example, because the user selected the telephone icon 52, the second image comprises a telephone keypad image 54 with icons for the user to dial a telephone number.

As another example, if the user had selected the camera icon 56 (see FIG. 8) rather than the telephone icon 52, then when the user changed the configuration of the sections 12, 14, the second image could have been a view of digital pictures stored in the memory or a digital picture software program application screen image. The user could then view the picture(s) or take other actions as available on the screen image.

Figure 12:
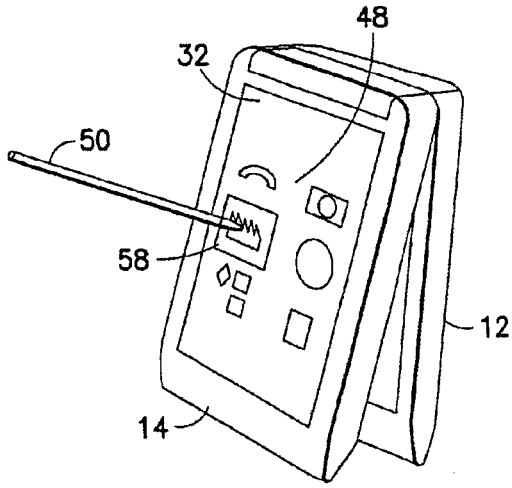
Figure 13:
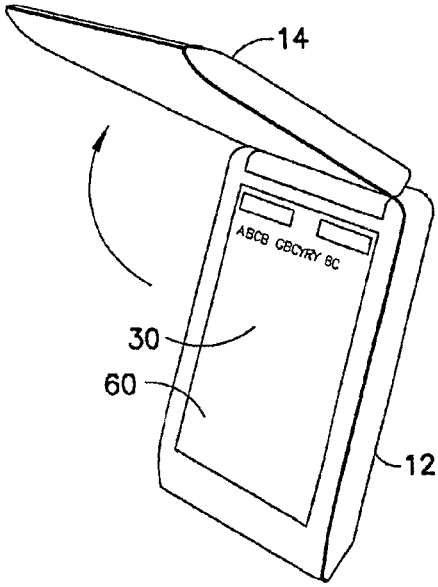
Figure 14:
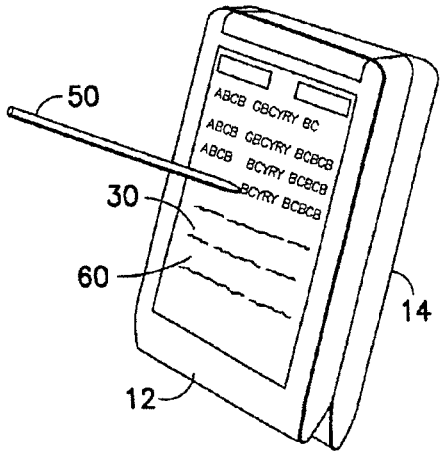

These examples illustrate that a selection on one of the displays (in these examples the second display 32) can change what is shown on the other display (in these examples the first display) when the first and second sections 12,14 are subsequently moved relative to each other. Views in a running application can also be changed based upon movement of the first and second sections 12, 14 relative to each other. For example, referring also to FIGS. 11-16, FIG. 11 shows the device 10 similar to FIG. 7. In FIG. 12, the stylus 50 is shown being used to select a writing tablet icon 58 to launch a notepad application using touch-screen technology. When the second section 14 is subsequently moved relative to the first section, as shown in FIG. 13, the image displayed on the first display comprises a writing tablet image 60. The main menu (image 48 shown in FIG. 7), or another selected mode or application open on display 32, can be left running on the display 32 (and perhaps temporality not illuminated to save battery life) so the user could go back to another mode/application by turning the page/section 14 back. As shown in FIG. 14, the user can use the stylus 50 to write information on the display 30 for subsequent storage in the memory (and perhaps character recognition transformation into typed text).

Figure 15:
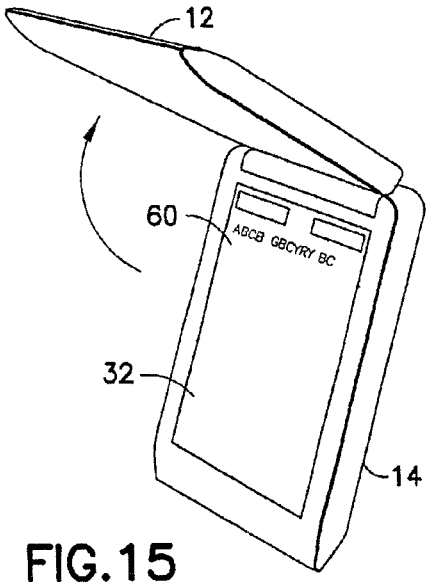
Figure 16:
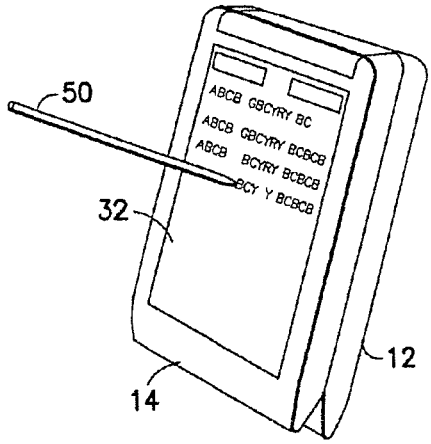

When the user wishes to move on to another page of the application (in this example another page of the writing tablet application), the user can flip the first section 12 as shown in FIG. 15. This results in the second section 14 being moved to the front again. The controller 24 can display the blank writing image 60 on the second display 32 and, as shown in FIG. 16, the user can continue writing into the application with the stylus 50, but this time via the second display 32. The first and second sections 12, 14 can be flipped relative to each other as many times as needed by the user similar to a steno book or memo book with the newly uncovered display 30 or 32 being blank each time a flip is made forward for further writing by the user.

Figure 17:
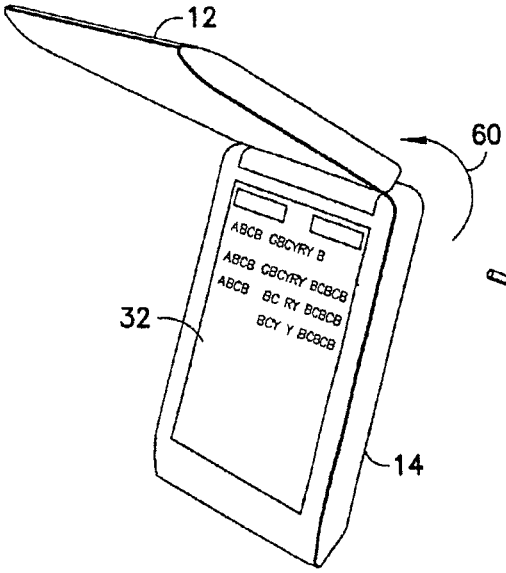
FIGS. 17-18 are perspective views of the device shown in FIGS. 11-16 being used to flip back to a previous application page by flipping one of the sections in a reverse direction of rotation.
Figure 18:
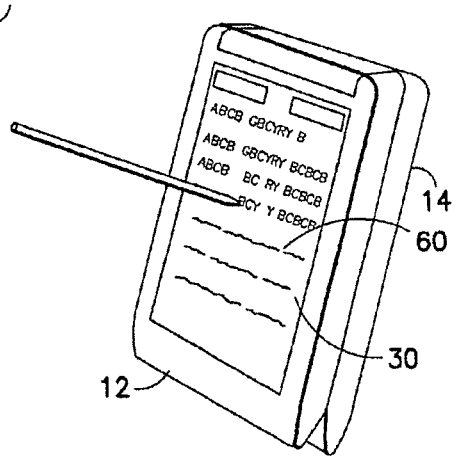

Referring also to FIGS. 17 and 18, the sections 12, 14 can be flipped in a reverse direction to return to previously viewed applications pages. For example, in the embodiment shown in FIGS. 17 and 18, the user can flip the first section 12 back as indicated by arrow 60 from the position shown in FIG. 16 to the position shown in FIG. 18. The position shown in FIG. 18 is the same as the position shown in FIG. 14 with the same information shown on the display as stored when the first section 12 was flipped in FIG. 12. Thus, the user can view a previously viewed page of the application. In this example, the user could edit or copy information from the previously written page shown in FIGS. 14 and 18. The user can jump back and forth between pages (and/or applications or modes) merely by flipping the sections 12, 14 back and forth. The device can automatically recognize the page change (section flipping) by the user when more space/pages are needed; for example, writing a document longer than one page. In other words, the user can write just like to a real notebook, turning to a clean page/section whenever needed, and can go back just like in a paper book.

The display being covered (i.e., the one that is passive in between of the two folding sections) can keep the second application open, resulting in the possibility to switch between the displays (and applications) so that the user always has the right application on the front display. As the user is finished writing he/she can save the document and can go back to the another application by changing the page/section or closing the first application. The invention enables virtually infinite pages to be created/turned/viewed. Also, this function supports the viewing of multi-paged calendar, e-mail list, etc. making "peeping" (quickly looking between pages and/or applications on different displays) possible while talking on the phone (multi-tasking) keeping the usability of the device very simple and clear.

An advantage of the invention is the ability of changing of the application views between the displays on the basis of the movement of the hinge or sections 12, 14 relative to each other. The invention enables multi-tasking (two applications open at the same time) and intuitive switching between applications. It basically presents a book metaphor (or similarity) for an electronic device user interface (UI). The invention can provide the advantages of intuitive and easy switching between applications and views.

One embodiment is basically constructed so that two displays are situated in opposite sides of each other, in separate blocks or sections 12, 14, when the device is imagined as "unfolded" (FIGS. 2 and 4-6). When the device is folded or enclosed (FIGS. 2 and 3) (note that it is the same which way the device is folded) there is always a display showing.

With the invention, at least two modes (or applications) can be open at the same time. A normal book page-change metaphor can be provided. An application having multiple pages can be viewed, similar to a paper book, changing sections 12,14 to change pages. Also, switching between applications can be done similarly. A physical embodiment can comprise sections able to turn completely around; reminiscent to a paper note book with a spring-like back end. The concept makes the movement of the sections 12, 14 into efficient use and gives the user a metaphor that is natural and simple; similar to a book or memo book or steno book.

Figure 19:
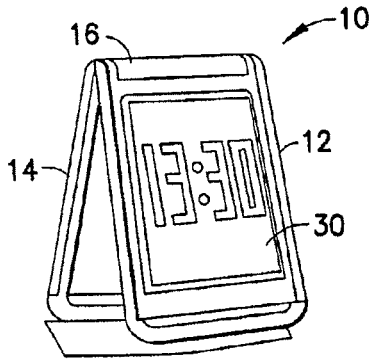
FIG. 19 is a perspective view of the device shown in FIG. 7 configured for an alarm/clock mode/application.
Figure 20:
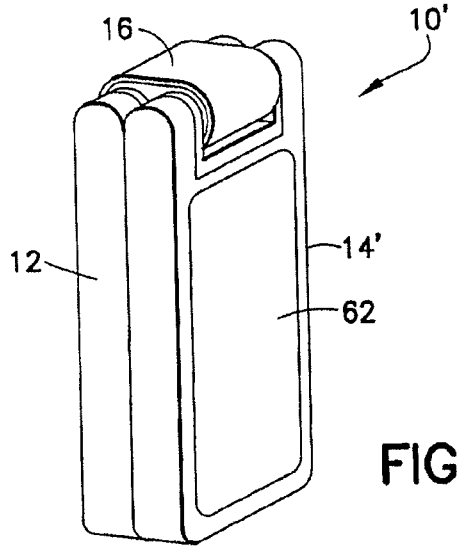
FIGS. 20-22 are perspective views similar to FIGS. 1-3, respectively, of an alternate embodiment of the invention.
Figure 21:
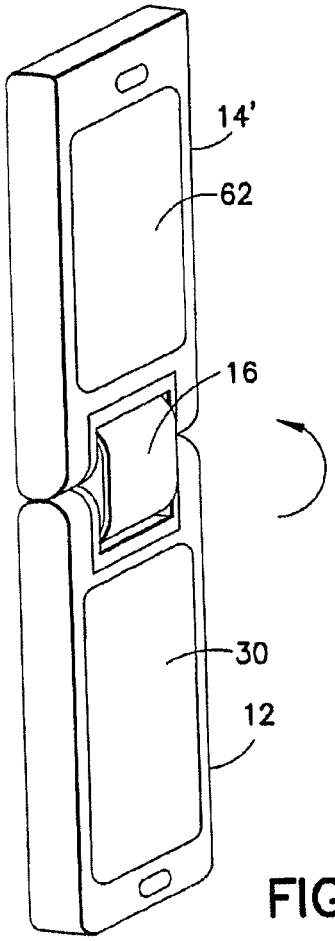
Figure 22:
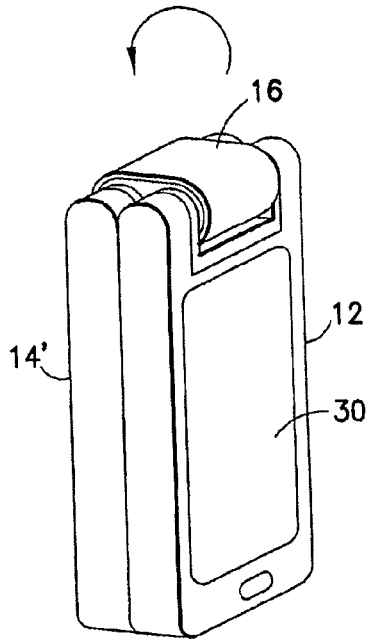

Referring also to FIG. 19, another application is shown. In this application the device 10 comprises an alarm clock mode/application. A user could select the application from the second display 32 shown in FIG. 1 and rotate the first and second sections 12, 14 relative to each other into the position shown in FIG. 19. The connection section 16 could comprise a detent system to lock the sections 12, 14 in the wedge shape shown in FIG. 19. The wedge shape allows the device 10 to be placed on a table top with the display 30 in a substantially vertical orientation (though slightly tilted). This, it is also possible to have mode like alarm-clock mode, reminding of old fashioned date/time index. Referring now to FIGS. 20-22, another embodiment of the invention is shown. In this embodiment the telephone 10' comprises only one display; the display 30 in the first section 12. The second section 14' does not comprise a display. Instead, the second section 14 comprises a window 62. The window could be a touch sensitive clear window, or just a clear protective window. In an alternate embodiment the window could merely comprise a hole. This embodiment could be used in a simpler telephone; perhaps merely intended to use the invention for flipping through digital pictures.

Figure 23:
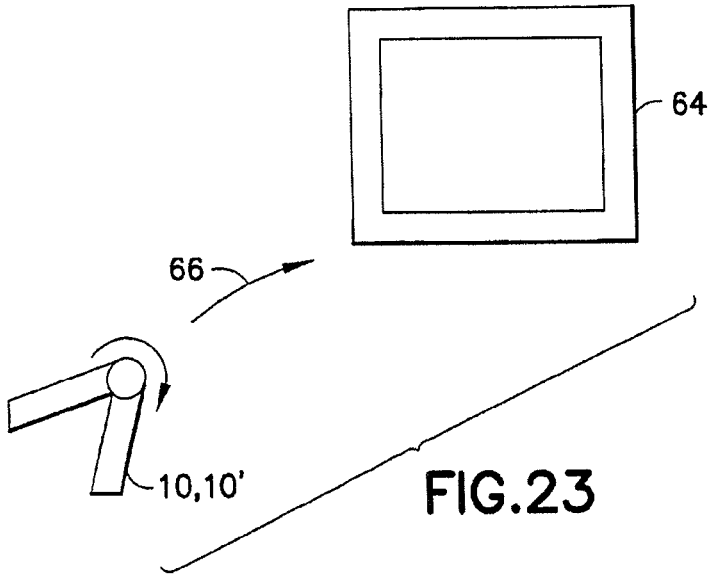
FIG. 23 is a diagram showing use of the invention with a remote display.

Referring also to FIG. 23, the device 10 or 10' could also be configured to output images to a display 64, such as by a wireless link 66 or even a wired connection. As the pages/sections 12, 14 are changed in the device 10, 10', the images displayed on the display 64 could change.

Figure 24:
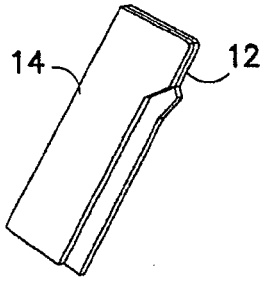
FIGS. 24-26 are perspective views of another alternate embodiment of the invention similar to the views shown in FIGS. 1-3, respectively, in different configurations.
Figure 25:
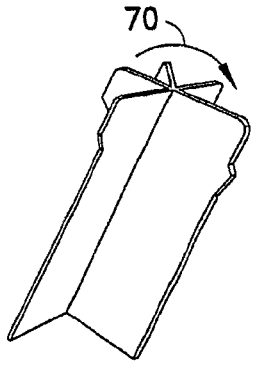
Figure 26:
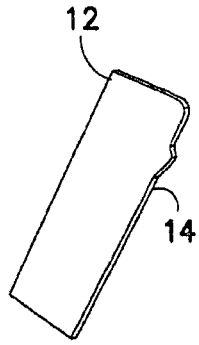

Referring also to FIGS. 24-26, another alternate embodiment of the invention is shown. In this embodiment the device 10" has two sections 12" and 14" connected by a connection section 16" located on the lateral sides of the sections 12", 14". Thus, the sections 12" and 14" can be rotated relative to each other as indicated by arrow 70; preferably back and forth and/or multiple times in a same direction.

As evident from the description above, features of the invention could be incorporated into various different types of embodiments or applications. The hand-held portable apparatus could comprise two substantially equal size and shape block sections as the major sections of the frame. These block sections could be virtually the same, or could have minor or substantial differences relative to each other. The software of the apparatus could be configured such that there is no formal primary state of the first and second block sections relative to each other. Thus, regardless of whether the first block section is in front or the second block section is in front, at least some of the same functions could be provided or performed at whichever one of the two block sections are in front at that time. Preferably, the shapes of the block sections support a book-like use, such as a steno book, which is easy to open, provide enough grip for a "page/block section" turning and easy to hold in a single hand firmly.

Figure 27:
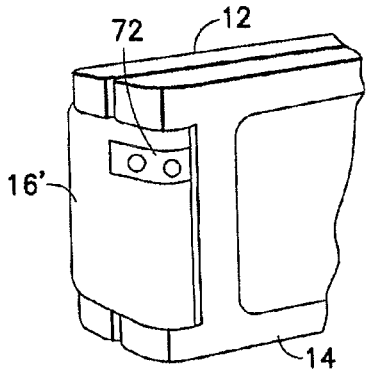
FIG. 27 is a partial perspective view of an alternate embodiment of the invention showing a user UI section on the hinge.
Figure 28:
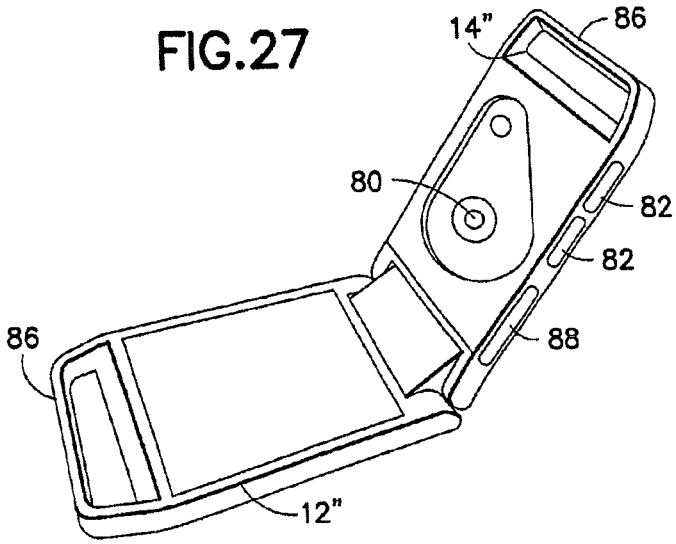
FIG. 28 is a perspective view of an alternate embodiment showing location of a camera.

One or both of the block sections could comprise a camera (still digital photo camera and/or video camera), an/or a camera could be provided in the hinge. One or both of the block sections, and/or the hinge, could comprise one or more camera mode specific buttons, such as a shutter button for example. The hinge could be part of the UI with a button or user actuated switch. As seen in FIG. 27, the hinge 16' could comprise a user selector switch 72 for the camera functions. The camera(s) could be located at any suitable position(s) on the block section(s). FIG. 28 shows one example where a camera 80 is located on the rear side of the second section 14". Second section 14" also has phone specific buttons 82 and a shutter button 88 on a side edge 84. These side edge buttons can be depressed regardless of the firs/second block section positioning relative to each other. Handles 86 are also provided on both block sections 12", 14".

If no camera is provided, the apparatus can still be a multimedia device for viewing, browsing, writing, an electronic calendar, etc. for example. A stylus can be provided on one or both of the block sections and may be magnetically attached. A center technology display can be provided as part of the UI and can be touch sensitive. A lens could be provided over the display if desired. As one of the two displays may be always visible, a transparent cover could be provided over the displays or the displays could be slightly recessed inside the surrounding frames of the block sections.

Figure 29:
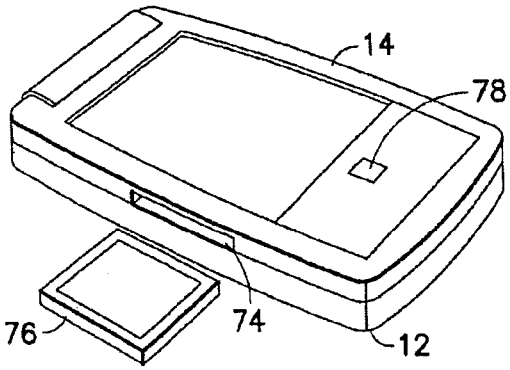
FIG. 29 is a perspective view of an alternate embodiment showing a memory card, slot and 5-way navigation key.
Figure 30:
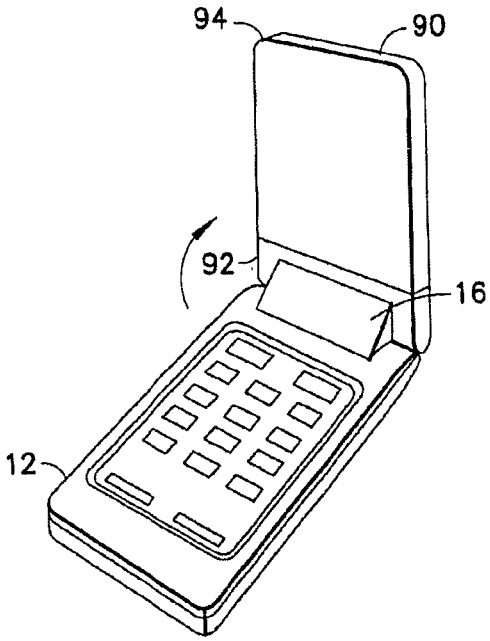
FIGS. 30-33 are perspective views of another alternate embodiment of the invention at various configurations.
Figure 31:
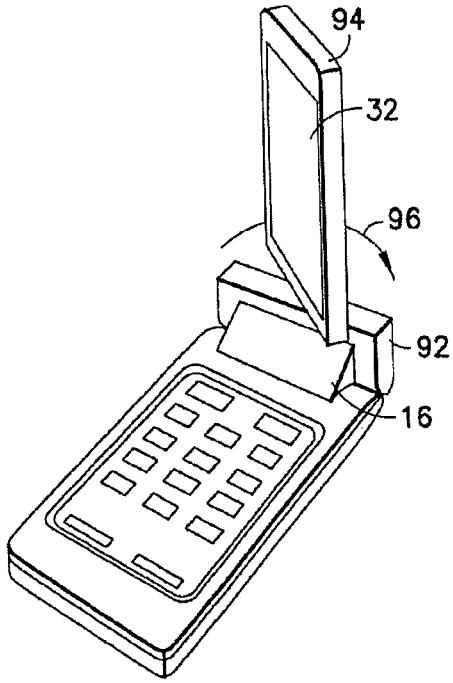

As seen in FIG. 29, one or both of the block sections could comprise an area 74 for removably receiving a memory card 76. A 5-way navigation key 78 can be provided on one or both of the block sections 12, 14. If provided on both block sections, no matter what mode or position of the two block sections relative to each other (first block section in front or second block section in front), the basic UI could remain the same regardless of which block section is located in front and, thus, not confusing to the user at any time. Thus, the user does not need to care which of the two block sections is left ON (i.e., is located in front) after viewing a multi-page document.

In another type of embodiment, one of the block sections could be smaller in length than the other block section. Thus, the software could be configured for different modes based upon whether the first block section is in front or the second block section is in front. In a first mode, such as with the longer/bigger block in front, the apparatus could be configured for telephone use with a touch screen based UI, a PDA mode, and simple call handling mode with the call handling keys. In the second mode, such as with the shorter/smaller block in front, the apparatus could be configured for a camera mode with a button or roller based UI or to answer an incoming call by flipping open. An "infinity" mode could also be provided such that the two block sections can be flipped over and over again relative to each other for features such as calendar, E-mail, document viewing-creation, gallery viewing etc.

Referring now to FIGS. 30-33, another alternate embodiment of the present invention is shown. In this embodiment, second section 90 is pivotably connected to the first section 12 by the 360 degree hinge 16. However, second section 90 has a first portion 92 and a second portion 94. Second portion 94 has the second display 32 and is rotatably connected to the first portion 92. Second portion 94 can be rotated relative to the first portion 92 and hinge 16 as indicated by arrow 96. The rotation axis is generally orthogonal to the axes of rotation at the hinge 16.

Figure 32:
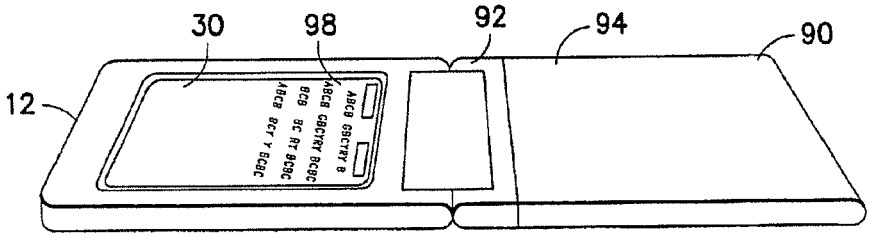
Figure 33:
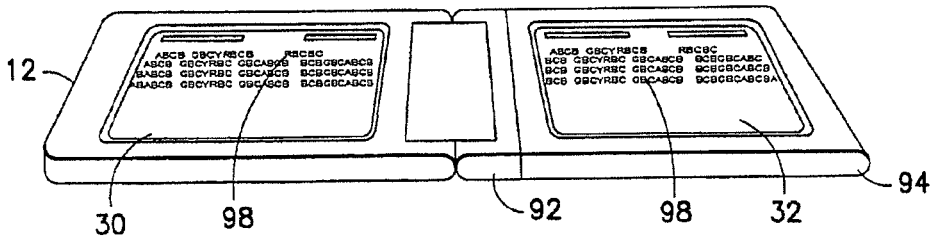

As seen in FIG. 32, the text 98 can be displayed on the first display 30 with a first portrait type of orientation when the second portion 94 is orientated at a first position relative to the first portion 92. As seen in FIG. 33, the text 98 can be automatically displayed on both the first display 30 and the second display at the same time with a second landscape type of orientation when the second portion 94 is orientated at a second position relative to the first portion 92. As seen in FIG. 33, and regardless of text orientation, two pages of a document or two images can be viewed at the same time next to each other. This might be useful for video or image editing (comparing an original image to the image as being edited). This configuration can also allow both displays 30, 32 to be used at the same time for telephone use. For example, display 30 having phone key icons and display 30 having other information or user selectable menu features.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A portable electronic device comprising:

a first section comprising a first display on a first side of the first section; and a second section pivotably connected to the first section, the second section comprising a second display on a first side of the second section, wherein the second section comprises a second side opposite the first side of the second section, wherein when the first and second sections are in a first folded configuration relative to each other the first side of the first section is located opposite the second side of the second section, wherein when the first and second sections are in the first folded configuration relative to each other the first display forms a front face of the device, and wherein when the first and second sections are in a second folded configuration relative to each other the second display forms the front face of the device;

*a sensor for sensing movement of the first and second sections relative to each other; and*

*a system connected to the sensor for changing images displayed on the first and second displays based, at least partially, upon movement of the first and second sections relative to each other wherein the system for changing*

*images displayed on the first and second displays is configured to display sequential page images of an application on sequential ones of the displays as the first and second sections are sequentially flipped relative to each other.*

2. A portable electronic device as in claim 1 wherein, when the first and second sections are in the second folded configuration relative to each other, the first side of the second section is located opposite a second side of the first section.

3. A portable electronic device as in claim 1 wherein the portable electronic device comprises a mobile telephone with a transceiver.

[4. A portable electronic device as in claim 1 further comprising:

a sensor for sensing movement of the first and second sections relative to each other; and a system connected to the sensor for changing images displayed on the first and second displays based, at least partially, upon movement of the first and second sections relative to each other.]

5. A portable electronic device as in claim [4] *1* wherein the system for changing images displayed on the first and second displays comprises means for selecting an application on the second display to be displayed on the first display when the first and second sections are subsequently moved from the first folded configuration.

6. A portable electronic device as in claim [4] *1* wherein the system for changing images displayed on the first and second displays comprises means for displaying sequential page images of an application on sequential ones of the displays as the first and second sections are sequentially flipped relative to each other.

7. A portable electronic device comprising:

a first section comprising a first display;

a second section pivotably movable relative to the first section, wherein the second section comprises a second display;

a sensor for sensing movement of the first and second sections relative to each other; and a system connected to the sensor for changing an image displayed on the first and second displays based upon movement of the first and second sections relative to each other;

wherein the system is configured to display a first page of an application on the first display, [and] wherein the system is configured to display a second different page of the same application on the second display when the first and second sections are pivotably moved relative to each other*, and wherein the system is configured to display sequential page images of an application on sequential ones of the displays as the first and second sections are sequentially flipped relative to each other.*

8. A portable electronic device as in claim 7 wherein the first and second displays face a same direction when the first and second sections are in a folded configuration.

9. A portable electronic device as in claim 8 wherein the system for changing an image is adapted to change an image displayed on the second display based upon movement of the first and second sections relative to each other.

10. A portable electronic device as in claim 8 wherein the system for changing an image comprises means for selecting an application on the second display to be displayed on the first display when the first and second sections are subsequently moved from a first folded configuration.

11. A portable electronic device as in claim 8 wherein the system for changing an image comprises means for displaying sequential page images of the application on sequential ones of the displays as the first and second sections are sequentially flipped relative to each other.

12. A portable electronic device as in claim 7 wherein the second section comprises a window to allow viewing of the first display through the second section.

13. A portable electronic device as in claim 7 wherein the portable electronic device comprises a mobile telephone with a transceiver.

14. A portable electronic device as in claim 7 further comprising means for selecting an image to be displayed on a second display based, at least partially, upon movement of the first and second sections relative to each other.

15. A portable electronic device as in claim 7 wherein the first and second sections are rotatable relative to each other about 360°.

16. A method of displaying images on displays of a portable electronic device comprising:

providing the portable electronic device with a first section having a first display and a second section having a second display, wherein the first section is pivotable relative to the second section; [and]

selecting an image to be displayed on the first display based, at least partially, upon pivoting of the second section to a folded configuration relative to the first section and an application selected or running on the second display, wherein when the second section is pivoted to the folded configuration the second display is concealed from view and the application continues to run on the second display*; and*

*changing images displayed on the first and second displays by displaying sequential page images of an application on sequential ones of the displays as the first and second sections are sequentially flipped relative to each other.*

17. A method as in claim 16 further comprising selecting an image to be displayed on the second display based, at least partially, upon movement of the first section relative to the second section and an application selected or running on the first display.

18. A method as in claim 16 further comprising flipping the first and second sections relative to each other in a first direction to sequentially view images on the displays in a first order.

19. A method as in claim 18 further comprising flipping the first and second sections relative to each other in an opposite second direction to sequentially view images on the displays in a second reverse order.

20. A method of changing display of images in a portable electronic device comprising:

providing the portable electronic device with a cover section pivotably movable relative to a base section, wherein at least one of the cover section and base section comprise a display;

displaying a first one of the images on the display, wherein the first one of the images comprises a first page of an application; [and]

moving the cover and base sections relative to each other, wherein a second different one of the images is automatically displayed on the first display or a second display based upon the movement of the cover and base sections relative to each other, wherein the second different one of the images comprises a second different page of the same application*; and*

*changing images displayed on the displays by displaying sequential page images of an application on sequential ones of the displays as the base and cover sections are sequentially flipped relative to each other.*

21. A method as in claim 20 further comprising flipping the cover and base sections relative to each other in a first direction to sequentially view images on the first display or the second display in a first order.

22. A method as in claim 21 further comprising flipping the first and second sections relative to each other in an opposite second direction to sequentially view images on the first display or the second display in a second reverse order.

23. A *non-transitory* computer readable medium embodied with a computer program for performing operations to change images displayed on displays of an apparatus, the operations comprising:

displaying a first one of the images on a first display of the displays when the apparatus is in a first folded configuration, wherein the first display forms a front face of the apparatus when the apparatus is in the first folded configuration;

subsequently determining if a first section of the apparatus is pivotably moved relative to a second section of the apparatus; [and]

automatically displaying a second one of the images to a second display of the displays based upon determination that the first section has been pivotably moved behind the second section to a second folded configuration, wherein the second display forms the front face of the apparatus when the apparatus is in the second folded configuration*; and*

*changing images displayed on the first and second displays by displaying sequential page images of an application on sequential ones of the displays as the first and second sections are sequentially flipped relative to each other.*

* * * * *